US012278431B2

(12) United States Patent
Sun et al.

(10) Patent No.: US 12,278,431 B2
(45) Date of Patent: Apr. 15, 2025

(54) ANTENNA ASSEMBLY AND COMMUNICATION TERMINAL

(71) Applicant: Lanto Electronic Limited, Kunshan (CN)

(72) Inventors: Bo Sun, Kunshan (CN); Rong Fu, Kunshan (CN); Xiange Yang, Kunshan (CN); Tonghui Xiao, Kunshan (CN)

(73) Assignee: LANTO ELECTRONIC LIMITED, Kunshan (CN)

( * ) Notice: Subject to any disclaimer, the term of this patent is extended or adjusted under 35 U.S.C. 154(b) by 203 days.

(21) Appl. No.: 18/127,753

(22) Filed: Mar. 29, 2023

(65) Prior Publication Data

US 2024/0145917 A1 May 2, 2024

(30) Foreign Application Priority Data

Oct. 26, 2022 (CN) ......................... 202211319689.5

(51) Int. Cl.
*H01Q 1/24* (2006.01)
*H01Q 5/378* (2015.01)
*H01Q 13/10* (2006.01)

(52) U.S. Cl.
CPC ............. *H01Q 5/378* (2015.01); *H01Q 13/10* (2013.01)

(58) Field of Classification Search
CPC ........... H01Q 1/24; H01Q 1/242; H01Q 1/22; H01Q 1/136; H01Q 1/48; H01Q 1/50; H01Q 5/28; H01Q 5/307; H01Q 5/371; H01Q 5/378; H01Q 13/10
See application file for complete search history.

(56) References Cited

U.S. PATENT DOCUMENTS

| | | | |
|---|---|---|---|
| 2012/0242555 A1 | 9/2012 | Hsieh et al. | |
| 2018/0323495 A1 | 11/2018 | Wei et al. | |
| 2019/0198975 A1 | 6/2019 | Chen et al. | |
| 2019/0296446 A1 | 9/2019 | Tseng et al. | |

FOREIGN PATENT DOCUMENTS

| | | | | |
|---|---|---|---|---|
| CN | 204966672 U | * | 1/2016 | ............... H01Q 1/24 |
| CN | 217507651 U | | 9/2022 | |
| CN | 112952363 B | | 12/2022 | |
| CN | 218448449 U | | 2/2023 | |
| TW | 201110460 A1 | | 3/2011 | |
| TW | 201832412 A | | 9/2018 | |

* cited by examiner

*Primary Examiner* — Hoang V Nguyen
(74) *Attorney, Agent, or Firm* — Birch, Stewart, Kolasch & Birch, LLP

(57) ABSTRACT

Disclosed in the embodiments of the present disclosure are an antenna assembly and a communication terminal, where a layout region is arranged at an edge position on a base frame, and a radiation pattern and a parasitic branch are arranged together on the layout region. Thus, in an aspect, when the communication terminal is assembled, it is convenient to observe the connection between a feed point and a ground point of the antenna assembly, thereby improving the assembly efficiency of the communication terminal. In another aspect, a parasitic branch is arranged near a second branch, so that the antenna has a larger bandwidth in a high frequency band. In yet another aspect, configuring a shape of a first slot, a second slot, and the parasitic branch enables direct adjustment to a resonance frequency of the antenna, which improves the adaptability of the antenna to different applications.

20 Claims, 8 Drawing Sheets

ANTENNA ASSEMBLY AND COMMUNICATION TERMINAL

CLAIM OF PRIORITY AND CROSS-REFERENCE TO RELATED APPLICATION(S)

This application claims the benefit of Chinese Patent Application No. 202211319689.5, filed on Oct. 26, 2022, which is incorporated herein by reference in its entirety.

BACKGROUND OF THE INVENTION

1. Field of the Invention

The present disclosure relates to the technical field of antennas, and in particular to, an antenna assembly and a communication terminal.

2. Description of the Related Art

With the continuous development of communication technologies, requirements of information transmission between different communication terminals are increasingly higher. For example, as the 5G communication gradually becomes mature, communication terminals are required to transmit information in more frequency bands. This requires an antenna on the communication terminals to have a stronger transceiving performance for electromagnetic signals. How to make an antenna have a plurality of resonance frequencies and simultaneously increase the bandwidth of the antenna becomes a problem to be solved.

BRIEF DESCRIPTION OF THE INVENTION

In view of this, the embodiments of the present disclosure provide an antenna assembly and a communication terminal, where a parasitic branch arranged at a second branch is used, so that a bandwidth of a resonance frequency of an antenna is increased and the communication performance of the antenna is improved.

According to a first aspect of the embodiments of the present disclosure, an antenna assembly is provided, including:

- a base frame including a layout region located at an edge of the base frame;
- a radiation pattern arranged in the layout region and including a first branch, a second branch, and a third branch opposite to the first branch and the second branch, where a feed point is arranged between the first branch and the second branch, and a first slot is formed between the third branch and the first branch and between the third branch and part of the second branch; and
- a parasitic branch having a ground point, where the parasitic branch is arranged in the layout region and forms a second slot with the second branch.

Further, one end of the second branch away from the first branch is electrically connected to the third branch;

- the third branch and the first branch simultaneously extend along an edge of the layout region; and
- the parasitic branch is located on a side of the second branch away from the third branch.

Further, the layout region has a side edge covering the third branch; and

- an extending direction of the parasitic branch is perpendicular to the side edge.

Further, the second branch further includes a recessed region located on a side of the second branch away from the third branch; and

- the parasitic branch is located at least partially within the recessed region and forms the second slot.

Further, the second branch includes an extension section and a bending section connected in sequence, and the extension section and the bending section surround the recessed region.

Further, the extension section includes a first rectangular pattern and a second rectangular pattern, and the first rectangular pattern and the second rectangular pattern are arranged in sequence by the feed point; and

- the second rectangular pattern includes a first edge and a second edge that are opposite to each other, the first edge is aligned with a side of the first rectangular pattern that forms the first slot, and the second edge forms the recessed region with the first rectangular pattern.

Further, the bending section includes a third rectangular pattern, the third rectangular pattern includes a third edge, and the third edge is adjacent and perpendicular to the second edge;

- the parasitic branch includes a fourth rectangular pattern; and
- each part of the second slot corresponding between the fourth rectangular pattern and the first rectangular pattern and between the second rectangular pattern and the third rectangular pattern has the same width.

Further, the bending section includes a fourth edge, and an included angle between the fourth edge and the second edge is an obtuse angle;

- the parasitic branch includes a fourth rectangular pattern; and
- each part of the second slot corresponding between the fourth rectangular pattern and the first rectangular pattern and between the fourth rectangular pattern and the second rectangular pattern has the same width.

Further, the first slot includes a first portion and a second portion, and the first portion corresponds to part of the bending section and coincides with a bending direction of the bending section.

Further, the parasitic branch has a first arc edge;

- the second branch has a second arc edge, and at least part of the second slot is formed between the first arc edge and the second arc edge.

Further, the layout region has a first surface, a second surface, a first through hole, and a second through hole, the first surface and the second surface deviate from each other, and the first through hole and the second through hole simultaneously communicate with the first surface and the second surface; and

- the radiation pattern and the parasitic branch are arranged on the first surface, and the feed point and the ground point respectively correspond to the first through hole and the second through hole.

Further, the antenna assembly further includes:

- a first connection pattern and a second connection pattern simultaneously located on the second surface, where the first connection pattern is connected to the radiation pattern through the first through hole, and the second connection pattern is connected to the parasitic branch through the second through hole.

Further, the second surface includes a connection surface located at an edge position in the layout region and perpendicular to a thickness direction of the layout region; and the first connection pattern and the second connection pattern simultaneously extend to the connection surface.

Further, an inner wall of the first through hole includes a first conical surface expanding towards the first surface;

the parasitic branch has a first arc edge located on the first conical surface and forming part of the second slot with the second branch; and the first arc edge has both a first bending direction and a second bending direction, where the first bending direction is along a circumferential direction of the first conical surface, and the second bending direction is curved towards the second surface.

Further, the length of both the first branch and the second branch is 0.23-0.27λ1, where the λ1 is an operating wavelength of the antenna assembly.

Further, the length of the first branch is negatively related to an operating frequency of the antenna assembly in a high frequency band;

the length of the second branch is negatively related to an operating frequency of the antenna assembly in a low frequency band;

the length of the third branch is negatively related to an operating frequency of the antenna assembly in a low frequency band;

the length of the parasitic branch is negatively related to a bandwidth operating frequency of the antenna assembly in a high frequency band; and the width of the first slot is positively related to an operating frequency of the antenna assembly.

According to a second aspect, the embodiments of the present disclosure further provide a communication terminal, including:

a base frame including a layout region located at an edge of the base frame;

a radiation pattern arranged in the layout region and including a first branch, a second branch, and a third branch opposite to the first branch and the second branch, where a feed point is arranged between the first branch and the second branch, and a first slot is formed between the third branch and the first branch and between the third branch and part of the second branch; and a parasitic branch having a ground point, where the parasitic branch is arranged in the layout region and forms a second slot with the second branch.

Further, the layout region has a first surface, a second surface, a first through hole, and a second through hole, the first surface and the second surface deviate from each other, and the first through hole and the second through hole simultaneously communicate with the first surface and the second surface; and the radiation pattern and the parasitic branch are arranged on the first surface, and the feed point and the ground point respectively correspond to the first through hole and the second through hole;

and the communication terminal further includes:

a circuit board arranged on an opposite side of the second surface;

a first connection pattern and a second connection pattern simultaneously located on the second surface, where the first connection pattern is connected to the radiation pattern through the first through hole, and the second connection pattern is connected to the parasitic branch through the second through hole; and two elastic connection members mounted on the circuit board, where a contact of the two elastic connection members respectively abuts the first connection pattern and the second connection pattern.

Further, the layout region includes a plurality of reserved through holes arranged at intervals along an edge of the layout region, and some of the reserved through holes form the first through hole and the second through hole.

Further, the communication terminal further includes:

a display screen arranged on a side of the circuit board deviating from the base frame and electrically connected to the circuit board; and a housing portion accommodating the display screen, the circuit board, and the base frame and including a front surface and a back surface, where the second surface faces the back surface.

According to the antenna assembly and the communication terminal in the embodiments of the present disclosure, a layout region is arranged at an edge position on a base frame, and a radiation pattern and a parasitic branch are arranged together on the layout region. Thus, in an aspect, when the communication terminal is assembled, it is convenient to observe the connection between a feed point and a ground point of the antenna assembly, thereby improving the assembly efficiency of the communication terminal. In another aspect, a parasitic branch is arranged near a second branch, so that the antenna has a larger bandwidth in a high frequency band. In yet another aspect, configuring a shape of a first slot, a second slot, and the parasitic branch enables direct adjustment to a resonance frequency of the antenna, which improves the adaptability of the antenna to different applications.

BRIEF DESCRIPTION OF THE DRAWINGS

Through the following description of the embodiments of the present invention with reference to the drawings, the above and other objectives, features and advantages of the present invention will become more apparent, wherein.

DETAILED DESCRIPTION OF EMBODIMENTS OF THE INVENTION

The present disclosure is described below based on embodiments, but the present disclosure is not merely limited to these embodiments. In the following detailed description of the present disclosure, some specific details are described in detail. Those skilled in the art may fully understand the present disclosure without the description of these details. In order to avoid obscuring the essence of the present disclosure, well-known methods, processes, procedures, elements and circuits are not described in detail.

In addition, those of ordinary skill in the art should be understood that drawings provided herein are for illustrative purposes, and the drawings are not necessarily drawn to scale.

Unless the context clearly requires otherwise, similar words such as "including" and "containing" throughout the application document should be interpreted as inclusive rather than exclusive or exhaustive; that is to say, it means "including but not limited to".

In the description of the disclosure, it should be understood that the terms "first" and "second" are only used for descriptive purposes, and cannot be understood as indicating or implying relative importance. In addition, in the description of the disclosure, unless otherwise stated, "plurality" means two or more.

Unless otherwise expressly specified and limited, the terms "mounted", "connected", "connection", "fixed", etc. should be understood broadly. For example, the "connection" may be a fixed connection, a detachable connection, or an integrated connection, may be a direct connection or an indirect connection by means of an intermediate medium, or may be an internal connection of two elements or an interaction between two elements, unless otherwise expressly limited. For those of ordinary skill in the art, the specific meaning of the terms in the present disclosure may be understood according to specific situations.

An operating frequency of an antenna, i.e., a resonance frequency, is closely related to a shape of the antenna. For a dipole antenna, the length of a single dipole is approximately a quarter of the operating frequency. For a slot antenna, the length of a slot formed in a metal pattern is approximately a half of the operating frequency. Thus, when the slot structure is fixed, the operating frequency of the slot antenna is also relatively fixed.

Figure 1:
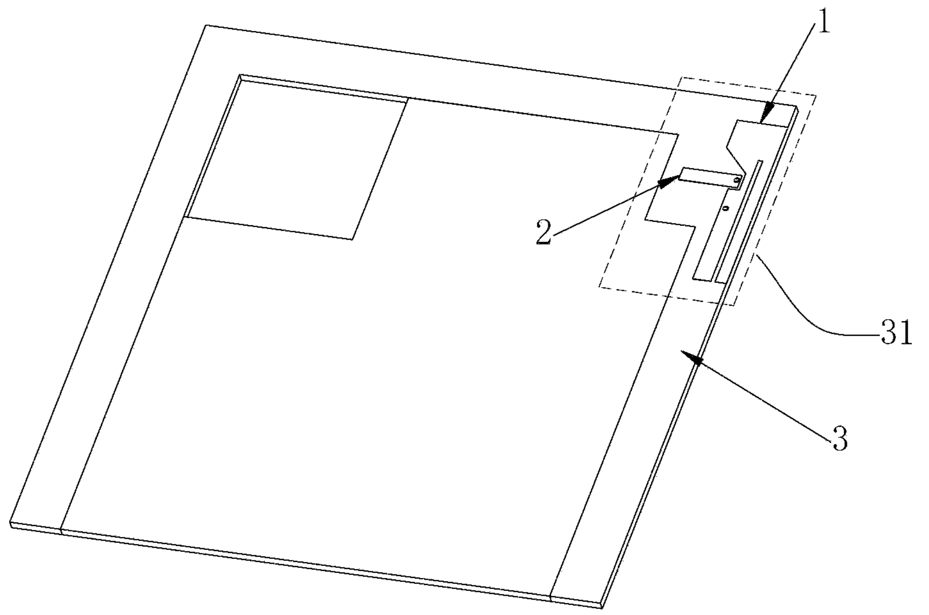
FIG. 1 is a schematic structural diagram of an antenna assembly according to an embodiment of the present disclosure in some implementations.
Figure 2:
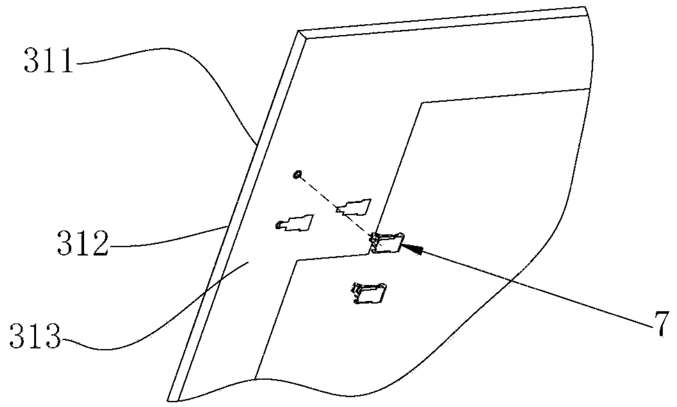
FIG. 2 is a schematic structural diagram of an antenna assembly according to an embodiment of the present disclosure in other implementations.

FIGS. 1 and 2 are schematic structural diagrams of an antenna assembly according to an embodiment of the disclosure in different directions. In the figures, the antenna assembly is substantially a square plate structure, and a layout region is located at a top corner of the square plate structure.

Figure 3:
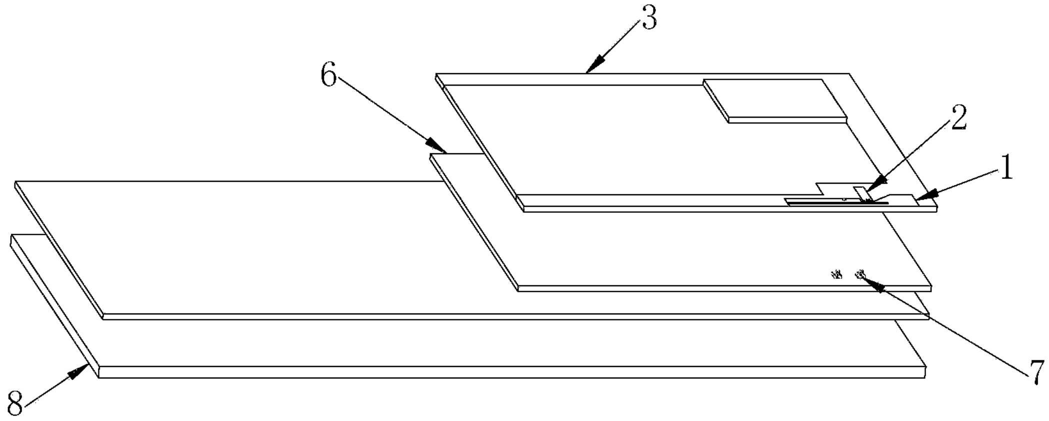
FIG. 3 is a schematic exploded diagram of an antenna assembly according to an embodiment of the present disclosure in some implementations.
Figure 4:
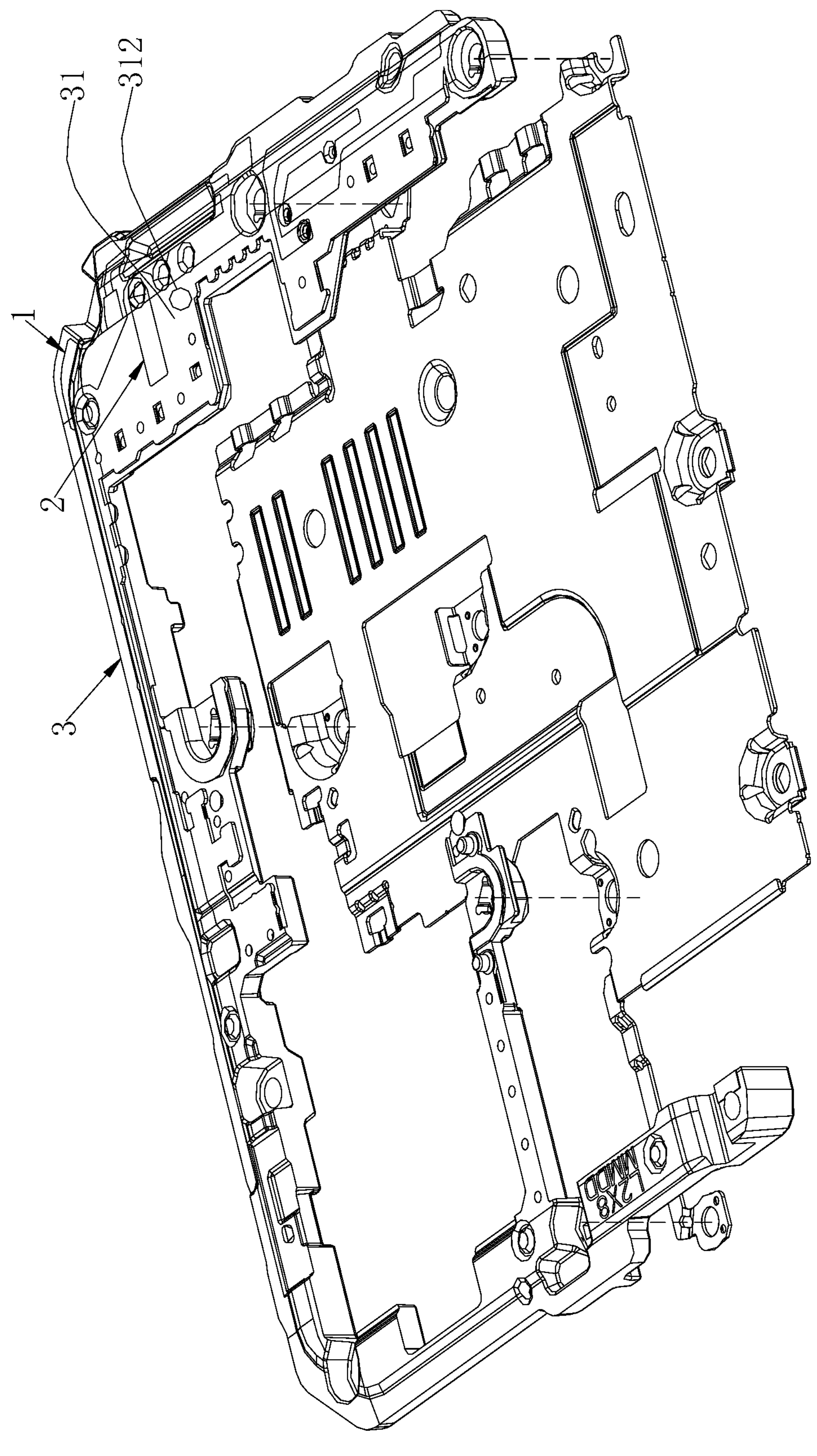
FIG. 4 is a schematic exploded diagram of an antenna assembly according to an embodiment of the present disclosure in other implementations.

FIGS. 3 and 4 are schematic exploded diagrams of an antenna assembly in different forms. A radiation pattern and a parasitic branch in both figures are directed to the outside of the antenna assembly.

Figure 7:
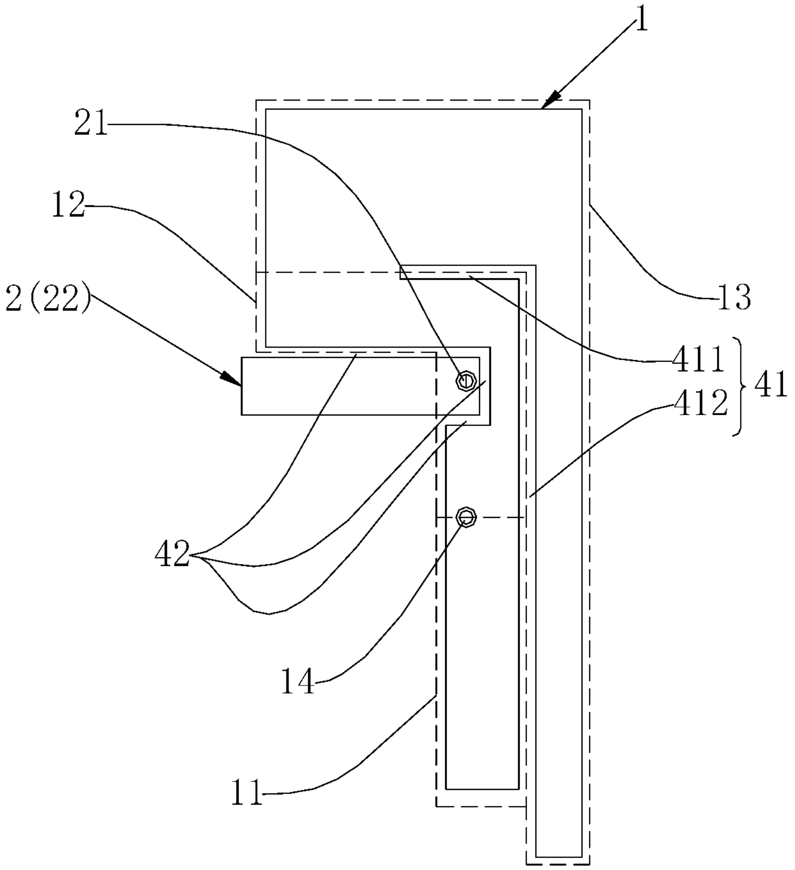
FIG. 7 is a schematic structural diagram of a radiation pattern and a parasitic branch according to an embodiment of the present disclosure in further other implementations.
Figure 8:
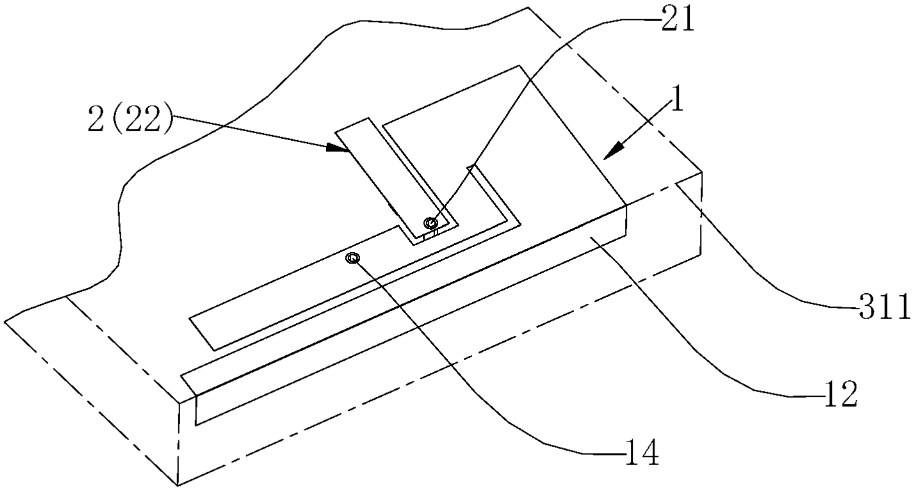
FIG. 8 is a schematic structural diagram of a radiation pattern and a parasitic branch according to an embodiment of the present disclosure in still other implementations.
Figure 9:
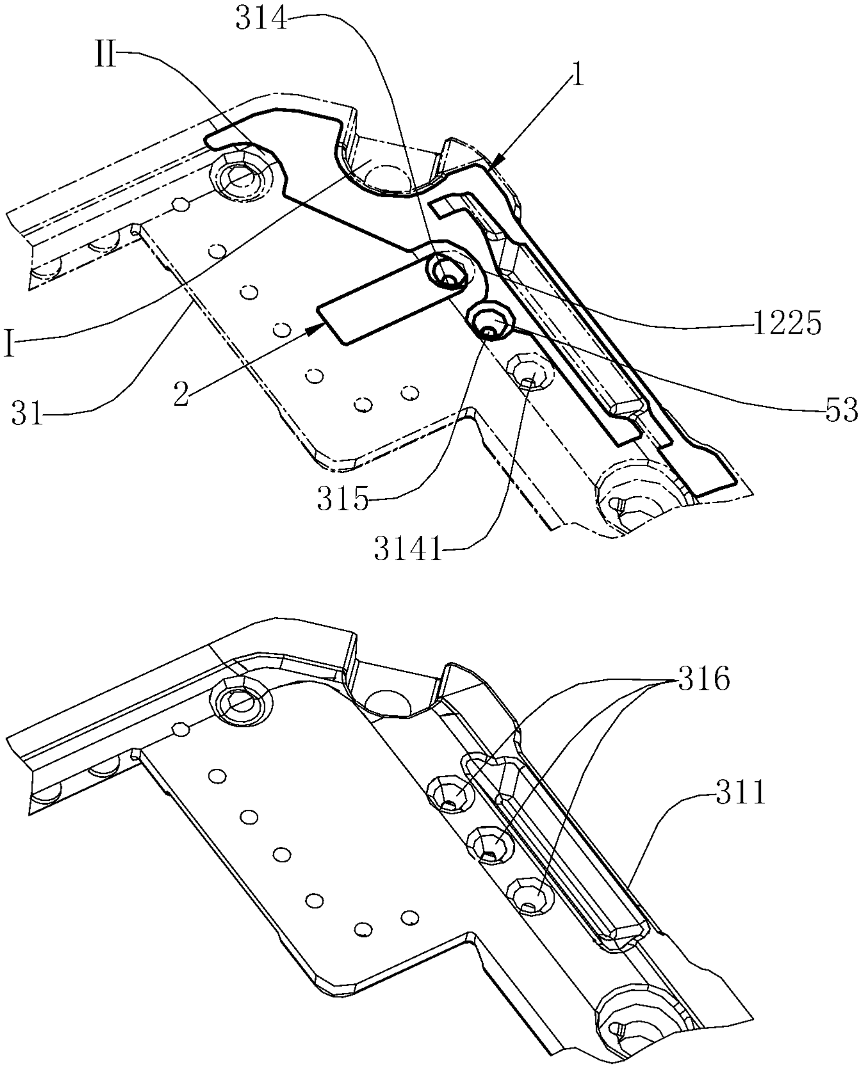
FIG. 9 is a schematic structural diagram of a radiation pattern and a parasitic branch according to an embodiment of the present disclosure in still other implementations.
Figure 10:
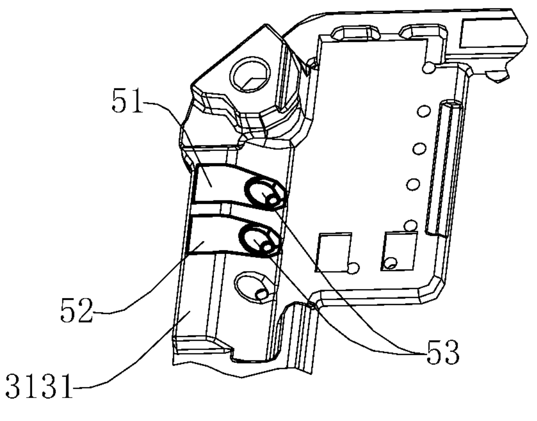
FIG. 10 is a schematic structural diagram of a radiation pattern and a parasitic branch according to an embodiment of the present disclosure in still other implementations.

FIGS. 5 to 11 show different structural forms of a radiation pattern and a parasitic branch. The dashed boxes shown in FIGS. 5 to 7 indicate an approximate position and form of a first branch 11, a second branch 12, and a third branch 13, respectively, so as to facilitate the description of the length and form of the sections. The thick solid lines in FIGS. 9 and 10 show metal patterns arranged on a base frame. The lower diagram in FIG. 9 shows a state before a radiation pattern 1 is arranged on a base frame 3.

Figure 12:
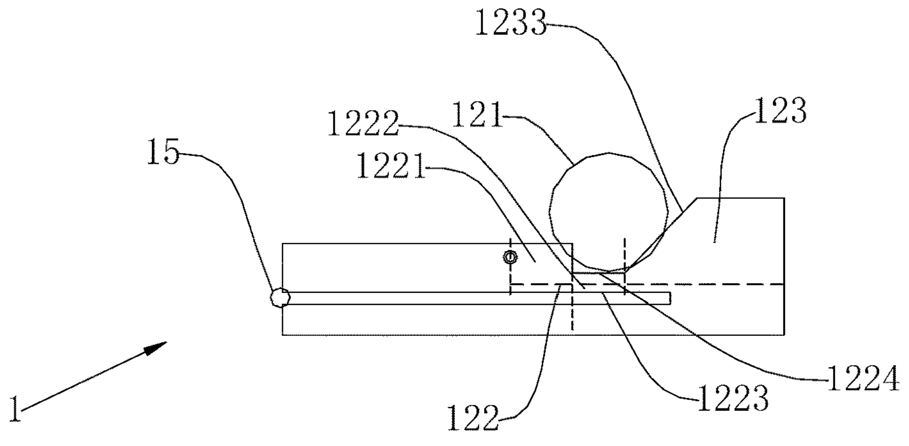
FIG. 12 is a schematic structural diagram of a radiation pattern according to an embodiment of the present disclosure in some implementations.
Figure 13:
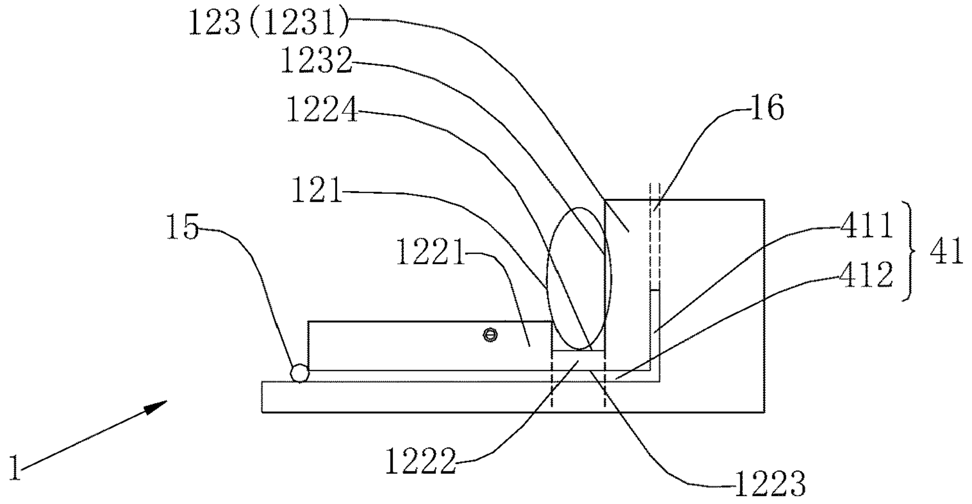
FIG. 13 is a schematic structural diagram of a radiation pattern according to an embodiment of the present disclosure in other implementations.

FIGS. 12 and 13 show two different forms of radiation patterns. The radiation pattern in FIG. 12 corresponds to the structure in FIG. 5. The radiation pattern in FIG. 13 corresponds to the structure in FIG. 7.

In some implementations, as shown in FIGS. 1 to 13, the antenna assembly in the present embodiment includes a base frame 3, a radiation pattern 1, and a parasitic branch 2. The base frame 3 includes a layout region 31 located at an edge of the base frame 3. The radiation pattern 1 is arranged in the layout region 31 and includes a first branch 11, a second branch 12, and a third branch 13 opposite to the first branch 11 and the second branch 12, where a feed point 14 is arranged between the first branch 11 and the second branch 12, and a first slot 41 is formed between the third branch 13 and the first branch 11 and between the third branch 13 and part of the second branch 12. The parasitic branch 2 has a ground point 21, where the parasitic branch 2 is arranged in the layout region and forms a second slot 42 with the second branch 12.

In some implementations, as shown in FIGS. 1 to 13, the length of both the first branch 11 and the second branch 12 is 0.23-0.27$\lambda 1$, where the $\lambda 1$ is an operating wavelength of the antenna assembly. Specifically, the length of both the first branch 11 and the second branch 12 is a quarter of the operating wavelength.

It is easily understood that, first, the first slot 41 is located approximately in the middle of the radiation pattern 1, which causes a waveguide (i.e., the radiation pattern 1) to be cut so that a cut current is able to excite the first slot 41, thereby enabling the waveguide to radiate an electromagnetic signal out through the first slot 41. Second, the slot may be equivalent to a pair of dipoles of equal length to the slot. The resonance frequency of the dipole antenna is related to the length of a dipole arm (quarter wavelength). Under this premise, the first slot 41 in the present embodiment is equivalent to two portions, one portion of which may be equivalent to a composition of the first branch 11 and part of the third branch 13, where the length of this portion is a quarter wavelength. The other portion is composed of part of the second branch 12 and the remaining part of the third branch 13, the length of which is less than a quarter wavelength. This enables the antenna assembly in the present embodiment to separately excite electromagnetic signals of different frequencies by using the same first slot 41. In other words, the present embodiment may be equivalent to using two pairs of dipole arms that are composed of the first branch 11 and part of the third branch 13 and part of the second branch 12 and the remaining third branch 13 to be respectively excited by an electromagnetic signal of a corresponding frequency. Third, in the present embodiment, the second slot 42 is formed between the parasitic branch 2 and the second branch 12, and the second slot 42 is used for coupling the parasitic branch 2 and the radiation pattern 1 to each other, so as to increase the bandwidth of the antenna.

According to the antenna assembly in the embodiments of the present disclosure, the layout region 31 is arranged at an edge position of the base frame 3, and the radiation pattern 1 and the parasitic branch 2 are arranged together on the layout region 31. Thus, in an aspect, when the communication terminal is assembled, it is convenient to observe the connection between the feed point 14 and the ground point 21 of the antenna assembly, thereby improving the efficiency of assembling the communication terminal. In another aspect, the parasitic branch 2 is arranged near the second branch 12, so that the antenna has a larger bandwidth in a high frequency region. In yet another aspect, configuring a shape of the first slot 41, the second slot 42, and the parasitic branch 2 enables direct adjustment to a resonance frequency of the antenna, which improves the adaptability of the antenna to different applications.

Optionally, the base frame 3 or the layout region 31 in the present embodiment is configured as a thermoplastic polymer containing laser powder. A three-dimensional circuit pattern is directly engraved on the base frame by using a laser direct structuring process, and then the pattern is electroplated to form a three-dimensional metal circuit, so that the base frame 3 has a certain electrical performance. A material of the base frame 3 in the present embodiment may be selected from nylon, plastic and the like containing laser powder. A specific shape of the base frame may be configured according to a shape of the communication terminal composed of the antenna assembly in the present embodiment, for example, in a form of a circle or a rectangle.

In another implementation, the antenna assembly in the above embodiment may be made through an FPC. FPC is a flexible printed circuit, and a common production process consists of steps such as pasting a dry film, exposing and forming a circuit, developing the circuit, etching the circuit, and removing the dry film. The radiation pattern 1 and the parasitic branch 2 in the above embodiment may be formed on a substrate of the flexible printed circuit by the above process.

In some implementations, as shown in FIGS. 1 to 13, the length of the first branch 11 is negatively related to an operating frequency of the antenna assembly in a high frequency band. The length of the second branch 12 is negatively related to an operating frequency of the antenna assembly in a low frequency band. The length of the third branch 13 is negatively related to an operating frequency of the antenna assembly in a low frequency band. The length of the parasitic branch 2 is negatively related to a bandwidth operating frequency of the antenna assembly in a high frequency band. The width of the first slot 41 is positively related to an operating frequency of the antenna assembly.

It is easily understood that operating frequency bands of 5G communication are mainly divided into two groups. One group is above 24 GHz, and the other group is below 6 GHz. The higher the operating frequency, the higher is a transmission rate achieved. However, a transmission distance is also significantly reduced, and a coverage capability is significantly weakened. Therefore, currently used frequency bands are mainly below 6 GHz. N78 in a 5G frequency band refers to 3.3 to 3.8 GHz, and N79 refers to 4.4 to 5.0 GHz.

The high frequency band in the present embodiment refers to N79, and the low frequency band refers to N78. Those skilled in the art may adjust the operating frequency of the antenna assembly based on a form of the radiation pattern 1 and the first slot 41 in the present embodiment. For example, the length of the first branch 11 may be increased when there is a need to reduce the operating frequency of the antenna assembly in a high frequency band. The length of the second branch 12 may be reduced when there is a need to increase the operating frequency of the antenna assembly in a low frequency band. The width of the first slot 41 may be directly increased when there is a need to increase the operating frequency of the antenna assembly on the whole. Therefore, the antenna assembly in the present embodiment may better meet the requirements of dual-frequency 5G communication.

In some implementations, as shown in FIGS. 1 to 13, one end of the second branch 12 away from the first branch 11 is electrically connected to the third branch 13. The third branch 13 and the first branch 11 simultaneously extend along an edge of the layout region 31. The parasitic branch 2 is located on a side of the second branch 12 away from the third branch 13.

Specifically, the second branch 12 and the third branch 13 in the present embodiment are connected by a belt region 16, so that the second branch 12 and the third branch 13 may transmit an electromagnetic signal. With respect to this, the first branch 11 and the third branch 13 form an opening 15 at an end in the extending direction, and the opening 15 makes the first slot 41 open. Thus, it will be more convenient for those skilled in the art to adjust the length of the first branch 11, the third branch 13, and the first slot 41. Two forms of an end portion of the third branch 13 are shown in FIGS. 12 and 13, respectively. The third branch 13 in FIG. 13 has a longer end portion than that in FIG. 12, which further reduces the operating frequency in a low frequency band. Thus, the requirements of the antenna assembly for different operating frequencies are met, and the adaptability of the product to different application scenarios is improved.

In some implementations, as shown in FIGS. 1 to 13, the layout region 31 has a side edge 311 covering the third branch 13. An extending direction of the parasitic branch 2 is perpendicular to the side edge 311. Two forms of the side edge are shown in FIGS. 8 and 9. Here, the side edge 311 in FIG. 9 has an arc transition. The length of the parasitic branch 2 and the length of the second slot 42 directly affect the operating frequency of the antenna assembly. However, when the layout region 31 is compact in structure, it is more difficult to make more space for arranging the parasitic branch 2. In the present embodiment, the radiation pattern 1 is moved to the edge of the layout region 31 as much as possible, and part of the third branch 13 is arranged using a side of the layout region 31, so that the layout region 31 is fully used in three-dimensional space to meet the requirements of the antenna for space.

In some implementations, as shown in FIGS. 1 to 13, the second branch 12 further includes a recessed region 121 located on a side of the second branch 12 away from the third branch 13. Simultaneously, the parasitic branch 2 is located at least partially within the recessed region 121 and forms the second slot 42. The second branch 12 is coiled around a side of the parasitic branch 2 by means of the recessed region 121, which increases the coupling between the two. In this case, a test curve of the antenna will move towards a low frequency faster. Thus, the area of the radiation pattern 1 is made smaller, the cost of the antenna assembly is lower, and the space is more compact.

Specifically, the ground point 21 is located within the recessed region 121. Simultaneously, the ground point 21 is equally distant from the side edge 311 as the feed point 14. The ground point 21 in the present embodiment is closer to the side of the layout region 31, which makes it more convenient to ground the parasitic branch 2.

In some implementations, as shown in FIGS. 1 to 13, the second branch 12 includes an extension section 122 and a bending section 123 connected in sequence, and the extension section 122 and the bending section 123 surround the recessed region 121. The recessed region 121, which is composed of the extension section 122 and the bending section 123 in the present embodiment, makes the parasitic branch 2 closer to the edge of the layout region 31, and the coupling strength between the parasitic branch 2 and the radiation pattern 1 may be changed by further configuring a bending angle and length of the bending section 123.

Further, the extension section 122 includes a first rectangular pattern 1221 and a second rectangular pattern 1222, and the first rectangular pattern 1221 and the second rectangular pattern 1222 are arranged in sequence by the feed point 14. The second rectangular pattern 1222 includes a first edge 1223 and a second edge 1224 that are opposite to each other, the first edge 1223 is aligned with a side of the first rectangular pattern 1221 that forms the first slot 41, and the second edge 1224 forms the recessed region 121 with the first rectangular pattern 1221. In the present embodiment, a side of the first rectangular pattern 1221 and a side of the second rectangular pattern 1222 that face the first slot 41 are on the same straight line, and a side of the second rectangular pattern 1222 away from the first slot 41 is offset from a side of the first rectangular pattern 1221 away from the first slot 41. That is, the first rectangular pattern 1221 is narrower than the second rectangular pattern 1222. Thus, the recessed region 121 formed between the first rectangular pattern 1221 and the second rectangular pattern 1222 presents a square recess having a more clear boundary, which helps those skilled in the art to control the length and width of the second slot 42.

In some implementations, as shown in FIGS. 1 to 13, the bending section 123 includes a third rectangular pattern 1231, the third rectangular pattern 1231 includes a third edge 1232, and the third edge 1232 is adjacent and perpendicular to the second edge 1224. Under this premise, the parasitic branch 2 includes a fourth rectangular pattern 22. Each part of the second slot 42 corresponding between the fourth rectangular pattern 22 and the first rectangular pattern 1221 and between the second rectangular pattern 1222 and the third rectangular pattern 1231 has the same width.

In the present embodiment, the bending section 123 and the parasitic branch are further configured, which on the one hand ensures that the second branch 12 has a sufficient length and no more space for the arrangement will be occupied. On the other hand, the second slot 42 formed presents three sequentially perpendicular portions. A specific form of the second slot 42 is shown in FIG. 7, where an upper portion of the second slot 42 extends horizontally, a middle portion extends vertically, and a bottom portion extends horizontally. Besides a perpendicular connection position between each portion, the width of other portions may be well kept consistent, which reduces the design difficulty for those skilled in the art.

Figure 5:
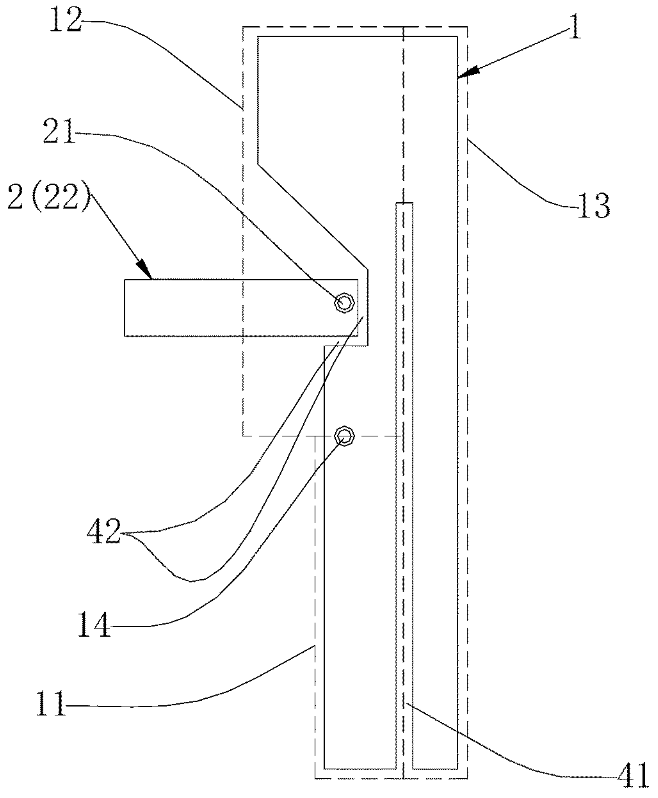
FIG. 5 is a schematic structural diagram of a radiation pattern and a parasitic branch according to an embodiment of the present disclosure in some implementations.

In other implementations, as shown in FIGS. 1 to 13, the bending section 123 includes a fourth edge 1233, and an included angle between the fourth edge 1233 and the second edge 1224 is an obtuse angle. The parasitic branch 2 includes a fourth rectangular pattern 22. Each part of the second slot 42 corresponding between the fourth rectangular pattern 22 and the first rectangular pattern 1221 and between the fourth rectangular pattern 22 and the second rectangular pattern 1222 has the same width. A specific form of the second slot 42 is shown in FIG. 5, where the included angle between the fourth edge 1233 and the second edge 1224 is approximately 135 degrees, and changing an angle of inclination of this region may help those skilled in the art to directly adjust a parasitic resonance between the two.

Figure 6:
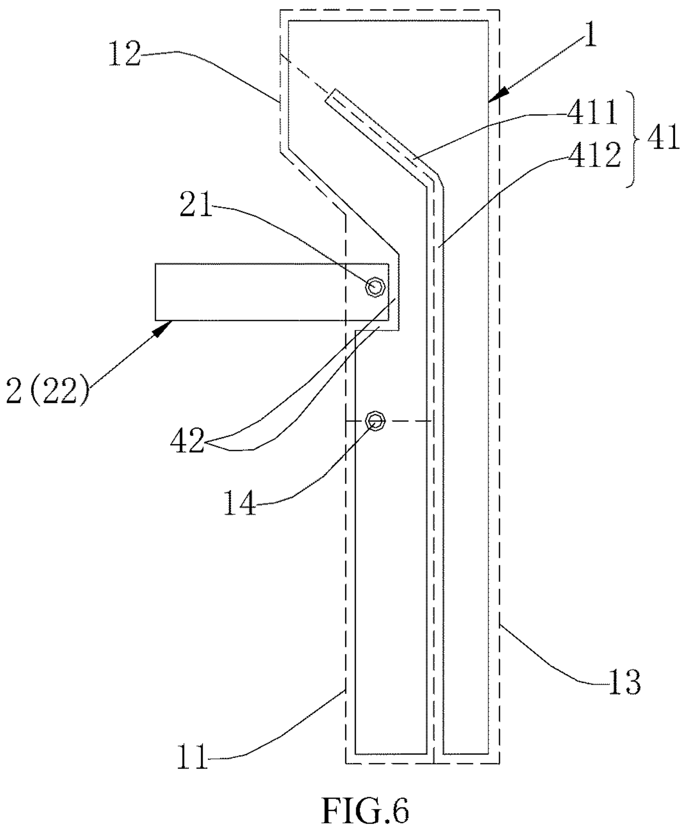
FIG. 6 is a schematic structural diagram of a radiation pattern and a parasitic branch according to an embodiment of the present disclosure in other implementations.

In some implementations, as shown in FIGS. 1 to 13, the first slot 41 includes a first portion 411 and a second portion 412, and the first portion 411 corresponds to part of the bending section 123 and coincides with a bending direction of the bending section 123. The first portion 411 and the second portion 412 in the present embodiment communicate with each other while ensuring an included angle between the two. Two forms of the second slot 42 are shown in FIGS. 6 and 7, where an included angle between the first portion 411 and the second portion 412 in FIG. 6 is approximately 135 degrees (the same angle as the bending section 123), and an included angle between the first portion 411 and the second portion 412 in FIG. 7 is 90 degrees (the same angle as the bending section 123). Configuring an angle of the first portion 411 enables the length of the first slot 41 to be longer and ensures that a size of the belt region 16 is not too small, so as to avoid affecting the connection between the second branch 12 and the third branch 13.

Figure 11:
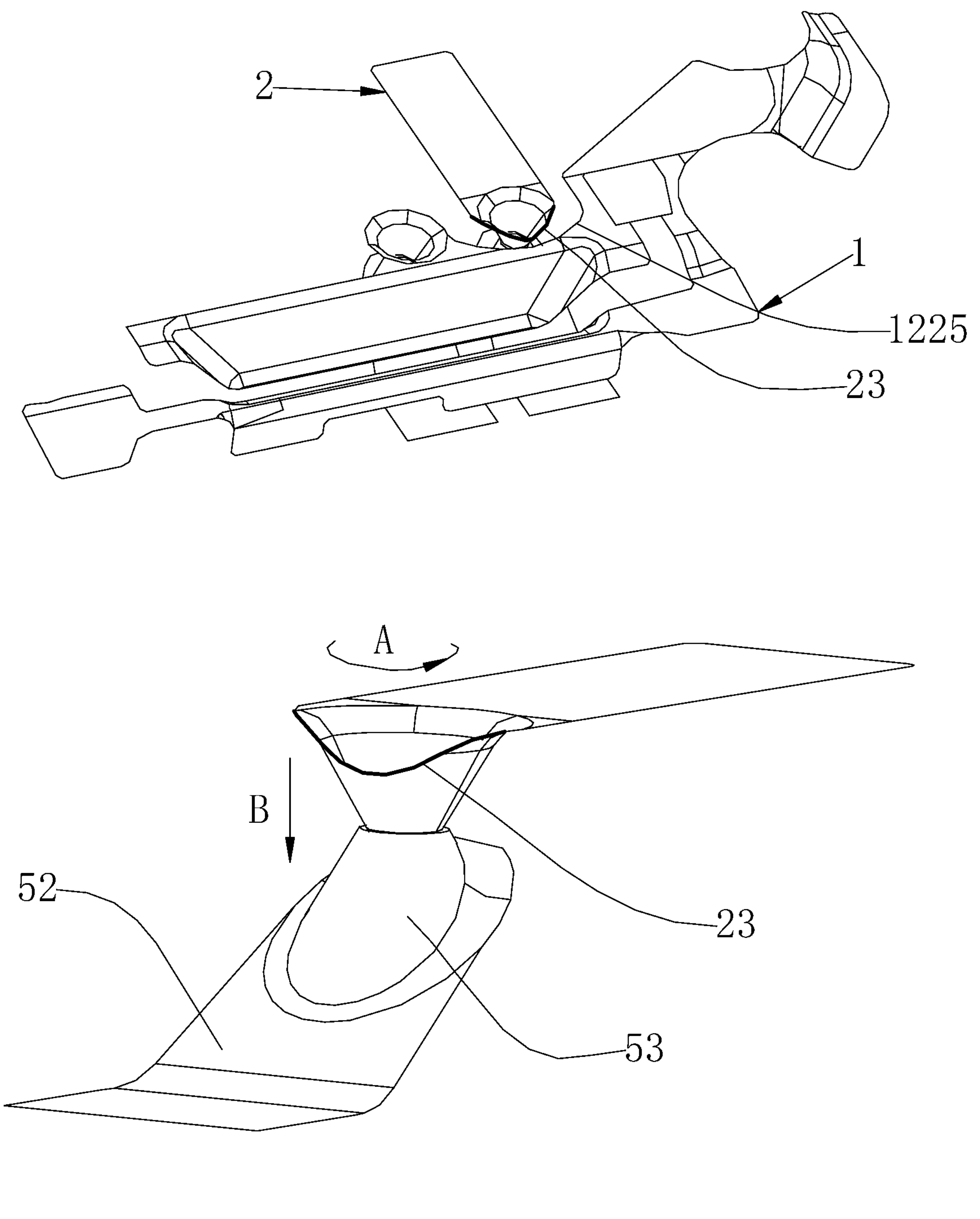
FIG. 11 is a schematic structural diagram of a radiation pattern and a parasitic branch according to an embodiment of the present disclosure in still other implementations.

In some implementations, as shown in FIGS. 9 to 11, the parasitic branch 2 has a first arc edge 23. With respect to this, the second branch 12 has a second arc edge 1225, and at least part of the second slot 42 is formed between the first arc edge 23 and the second arc edge 1225. The second slot 42 in the present embodiment is partially arc-shaped, and the arc-shaped second slot 42 may become narrower in a case of the same area.

In some implementations, as shown in FIGS. 9 to 11, the layout region 31 has a first surface 312, a second surface 313, a first through hole 314, and a second through hole 315, where the first surface 312 and the second surface 313 deviate from each other, and the first through hole 314 and the second through hole 315 simultaneously communicate with the first surface 312 and the second surface 313. The radiation pattern 1 and the parasitic branch 2 are arranged on the first surface 312, and the feed point 14 and the ground point 21 respectively correspond to the first through hole 314 and the second through hole 315. In the present embodiment, the first through hole 314 and the second through hole 315 are used so that the antenna assembly may be electrically connected to the radiation pattern 1 and the parasitic branch 2 through the second surface 313. For example, the radiation pattern 1 and the parasitic branch 2 are arranged on a side facing away from an excitation source, so as to avoid a short circuit between the radiation pattern 1 and the parasitic branch 2 and a component on a circuit board 6.

Further, the antenna assembly further includes a first connection pattern 51 and a second connection pattern 52 simultaneously located on the second surface 313, where the first connection pattern 51 is connected to the radiation pattern 1 through the first through hole 314, and the second connection pattern 52 is connected to the parasitic branch 2 through the second through hole 315.

Specifically, the first connection pattern 51 and the second connection pattern 52 are formed on an inner wall of the first through hole 314 and the second through hole 315 by using the above laser direct structuring process. Thus, a metal pattern on the first surface 312 is electrically connected to a metal pattern on the second surface 313.

In some implementations, as shown in FIGS. 1 to 13, the second surface 313 includes a connection surface 3131 located at an edge position in the layout region 31 and perpendicular to a thickness direction of the layout region 31. The first connection pattern 51 and the second connection pattern 52 simultaneously extend to the connection surface 3131.

Specifically, the ground point 21 is located on a side of the second branch 12 away from the first slot 41 and within the recessed region 121. The ground point 21 is equally distant from the edge of the layout region 31 as the feed point 14. Thus, in the present embodiment, the ground point 21 and the feed point 14 are arranged at an edge position near the layout region 31, so that an operator may observe the position when mounting the antenna assembly to determine whether the connection is correct.

In some implementations, as shown in FIGS. 1 to 13, an inner wall of the first through hole 314 includes a first conical surface 3141 expanding towards the first surface 312. The parasitic branch 2 has a first arc edge 23 located on the first conical surface 3141 and forming part of the second slot 42 with the second branch 12. The first arc edge 23 has both a first bending direction and a second bending direction, where the first bending direction is along a circumferential direction of the first conical surface 3141, and the second bending direction is curved towards the second surface 313. The thick solid line in FIG. 11 shows one form of the first arc edge 23. An arrow A and an arrow B in the figure respectively indicate the first bending direction and the second bending direction of the first arc edge 23 in the present embodiment.

It is easily understood that, to facilitate the laser structuring process, positions where the inner wall of the first through hole 314 and the inner wall of the second through hole 315 face the first surface 312 and the second surface 313 are respectively arranged in a bell-mouth shape. That is, the first through hole 314 and the second through hole 315 both are provided with the first conical surface 3141 on the inner wall thereof. Meanwhile, in order to make full use of the space at the edge of the layout region 31, the first arc edge 23 is arranged on the first conical surface 3141 (as shown in the upper diagram in FIG. 9).

Under this premise, a distance from the first arc edge 23 on the first conical surface 3141 to the second branch 12 (the second arc edge 1225) changes. A middle part of the first arc edge 23 is closer to the second arc edge 1225. To this end, in the present embodiment, the second bending direction is further provided on the first arc edge 23, so as to keep the distance between the first arc edge 23 and the second arc edge 1225 as consistent as possible.

Specifically, a third connection pattern 53 is arranged on the inner wall of the first through hole 314, a side near the second surface 313, and two ends of the second through hole 315. The third connection pattern 53 is used for electrically connecting the radiation pattern 1 to the first connection pattern 51 and the parasitic branch 2 to the second connection pattern 52. For the second slot 42 shown in FIG. 9, the middle region is formed by the first arc edge 23 with the second arc edge 1225, and the second slot 42 located at two sides is respectively formed by two straight edges of the parasitic branch 2 respectively with the bending section 123 and the third connection pattern 53. Thus, the structure of the above radiation pattern and parasitic branch 2 is made more compact.

Optionally, in order to further reduce a frequency of the radiation pattern 1 in the figure, a connection region of the second branch 12 and the third branch 13 extends towards a side away from the opening, which forms an extension region. In order to avoid a fixed position of the base frame 3, two avoidance regions are arranged in this region (region I and region II shown in FIG. 9).

The antenna assembly in the above embodiment may be applied to a communication terminal to achieve a communication connection of the communication terminal with an external device. The communication terminal includes, but is not limited to, an electronic book, a mobile phone, or a smart watch, etc.

In one optional implementation, as shown in FIGS. 1 to 13, the communication terminal includes a base frame 3, a radiation pattern 1, and a parasitic branch 2. The base frame 3 includes a layout region 31 located at an edge of the base frame 3. The radiation pattern 1 is arranged in the layout region 31 and includes a first branch 11, a second branch 12, and a third branch 13 opposite to the first branch 11 and the second branch 12, where a feed point 14 is arranged between the first branch 11 and the second branch 12, and a first slot 41 is formed between the third branch 13 and the first branch 11 and between the third branch 13 and part of the second branch 12. The parasitic branch 2 has a ground point 21, and meanwhile the parasitic branch 2 is arranged in the layout region and forms a second slot 42 with the second branch 12.

According to the communication terminal in the embodiments of the present disclosure, the layout region 31 is arranged at an edge position on the base frame 3, and the radiation pattern 1 and the parasitic branch 2 are arranged together on the layout region 31. Thus, in an aspect, when the communication terminal is assembled, it is convenient to observe the connection between the feed point 14 and the ground point 21 of the antenna assembly, thereby improving the efficiency of assembling the communication terminal. In another aspect, the parasitic branch 2 is arranged near the second branch 12, so that the antenna has a larger bandwidth in a high frequency region. In yet another aspect, configuring a shape of the first slot 41, the second slot 42, and the parasitic branch 2 enables direct adjustment to a resonance frequency of the antenna, which improves the adaptability of the antenna to different applications.

Figure 14:
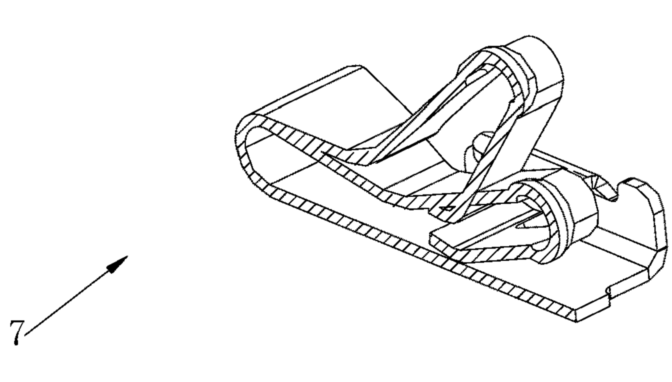
FIG. 14 is a schematic structural diagram of an elastic connection member according to an embodiment of the present disclosure.

FIG. 14 is a schematic structural diagram of an elastic connection member according to an embodiment of the present disclosure. In some implementations, as shown in FIGS. 1 to 14, the layout region 31 has a first surface 312, a second surface 313, a first through hole 314, and a second through hole 315, where the first surface 312 and the second surface 313 deviate from each other, and the first through hole 314 and the second through hole 315 simultaneously communicate with the first surface 312 and the second surface 313. The radiation pattern 1 and the parasitic branch 2 are arranged on the first surface 312, and the feed point 14 and the ground point 21 respectively correspond to the first through hole 314 and the second through hole 315. Meanwhile, the communication terminal further includes a circuit board 6, a first connection pattern 51, and a second connection pattern 52. The circuit board 6 is arranged on an opposite side of the second surface 313, the first connection pattern 51 and the second connection pattern 52 are simultaneously located on the second surface 313, the first connection pattern 51 is connected to the radiation pattern 1 through the first through hole 314, and the second connection pattern 52 is connected to the parasitic branch 2 through the second through hole 315. Two elastic connection members 7 are mounted on the circuit board 6, where a contact of the two elastic connection members 7 respectively abuts the first connection pattern 51 and the second connection pattern 52.

A bottom part of the elastic connection members 7 in the present embodiment is mounted on the circuit board 6, a top part is the contact of the elastic connection members 7, and the contact moves downwards when pressed. Through the abutment of the elastic connection members 7 against the antenna assembly, when the antenna assembly is mounted on one side of the circuit board 6, an electrical connection of the radiation pattern 1 and the parasitic branch 2 to the circuit board 6 may be implemented, which facilitates a mounting operation of the communication terminal.

In some implementations, as shown in FIGS. 1 to 13, the layout region 31 includes a plurality of reserved through holes 316 arranged at intervals along an edge of the layout region 31, and some of the reserved through holes 316 form the first through hole 314 and the second through hole 315.

When the antenna assembly in the present embodiment receives and sends different types of electromagnetic signals, the corresponding radiation pattern 1 also changes. The length of the first branch 11 and the second branch 12 and a coupling position of the parasitic branch 2 may be adjusted according to actual needs by reserving the plurality of reserved through holes 316 in the layout region 31. One form of the reserved through holes 316 is shown in FIG. 9, which includes three reserved through holes 316 arranged at intervals. The reserved through hole 316 at an upper left part and a middle part is respectively used to form the first through hole 314 and the second through hole 315, while the reserved through hole 316 at a lower right part is not used. When those skilled in the art need to greatly increase a frequency of the first branch 11, the reserved through hole 316 at the lower right part may be used to connect to the first branch, so as to reduce the length of the first branch 11.

In some implementations, as shown in FIGS. 1 to 13, the communication terminal further includes a display screen 8 and a housing portion (not shown in the figure). The display screen 8 is arranged on a side of the circuit board 6 deviating from the base frame 3 and electrically connected to the circuit board 6. The housing portion is used for accommodating the display screen 8, the circuit board 6, and the base frame 3 and includes a front surface and a back surface, where the second surface 313 faces the back surface. The display screen 8, the circuit board 6, and the base frame 3 are sequentially mounted inside the housing portion, which simplifies a mounting step. Meanwhile, the radiation pattern 1 and the parasitic branch 2 deviating from the circuit board 6 may avoid a short circuit with an internal component.

Figure 15:
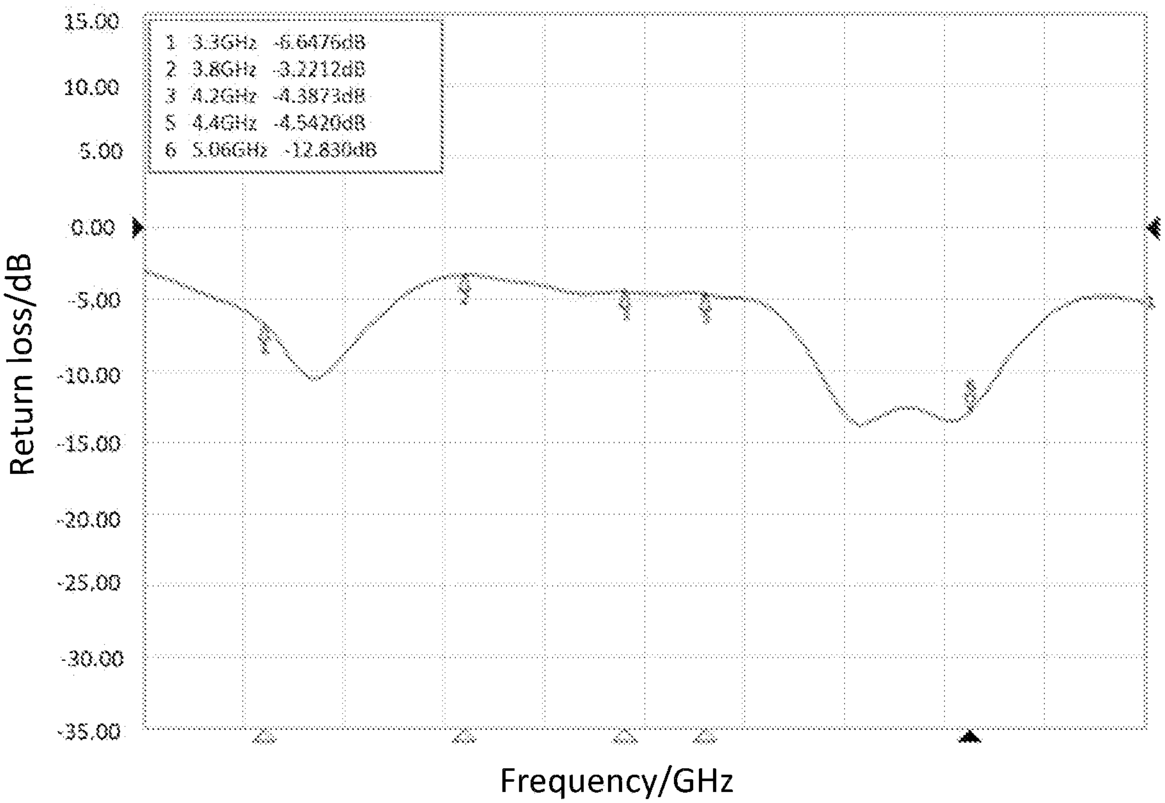
FIG. 15 is a return loss test diagram of an antenna assembly according to an embodiment of the present disclosure.

FIG. 15 is a return loss test diagram of an antenna assembly according to an embodiment of the present disclosure. A smaller value on a vertical axis in the figure indicates a smaller return loss of the antenna. A frequency band where the return loss is below −5 dB in the figure is around 3.3 GHz and around 4.5 to 5.5 GHz. That is, the antenna assembly in the embodiments of the present disclosure may meet an N78 frequency band and N79 frequency band in 5G communication.

Figure 16:
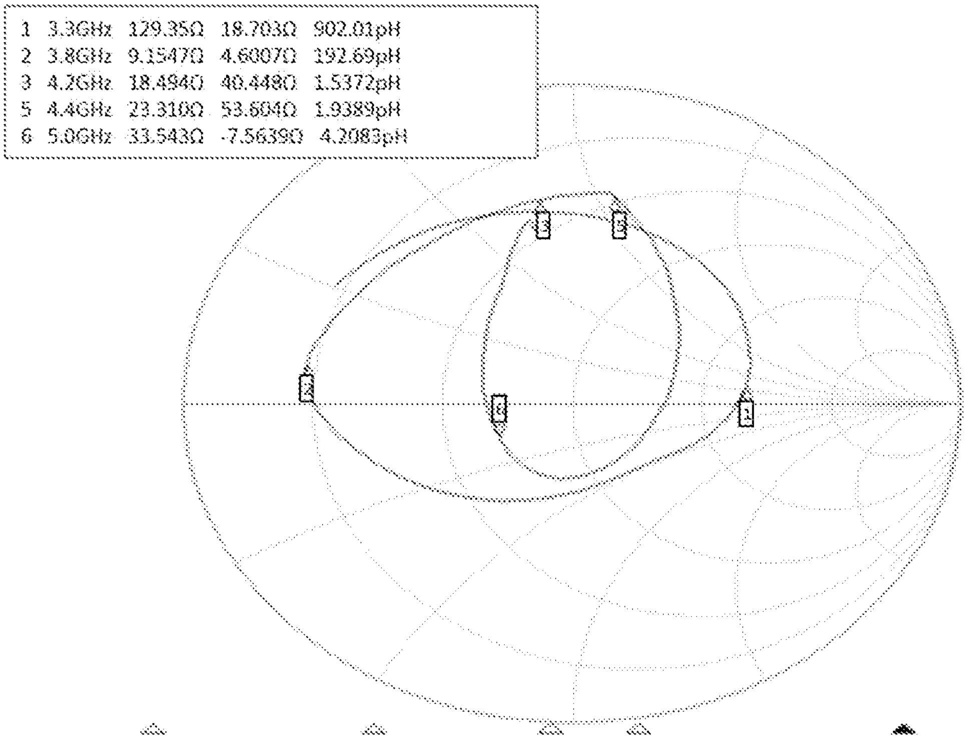
FIG. 16 is a Smith simulation test diagram of an antenna assembly according to an embodiment of the present disclosure.

FIG. 16 is a Smith simulation test diagram of an antenna assembly according to an embodiment of the present disclosure. In the figure, both the N78 frequency band and the N79 frequency band are concentrated at the center of the Smith chart, and therefore, the antenna assembly has a good impedance matching design.

The above description is merely preferred embodiments of the present disclosure and is not used to limit the present disclosure. For those skilled in the art, the present disclosure may have various modifications and variations. Any modification, equivalent replacement, improvement, and the like made with the spirit and principle of the present disclosure should be included in the protection scope of the present disclosure.

What is claimed is:

1. An antenna assembly, comprising:

a base frame comprising a layout region located at an edge of the base frame;

a radiation pattern arranged in the layout region and comprising a first branch, a second branch, and a third branch opposite to the first branch and the second branch, wherein a feed point is arranged between the first branch and the second branch, and a first slot is formed between the third branch and the first branch and between the third branch and part of the second branch; and a parasitic branch having a ground point, wherein the parasitic branch is arranged in the layout region and forms a second slot with the second branch.

2. The antenna assembly according to claim 1, wherein one end of the second branch away from the first branch is electrically connected to the third branch;

the third branch and the first branch simultaneously extend along an edge of the layout region; and the parasitic branch is located on a side of the second branch away from the third branch.

3. The antenna assembly according to claim 2, wherein the layout region has a side edge covering the third branch; and an extending direction of the parasitic branch is perpendicular to the side edge.

4. The antenna assembly according to claim 1, wherein the second branch further comprises a recessed region located on a side of the second branch away from the third branch; and the parasitic branch is located at least partially within the recessed region and forms the second slot.

5. The antenna assembly according to claim 4, wherein the second branch comprises an extension section and a bending section connected in sequence, and the extension section and the bending section surround the recessed region.

6. The antenna assembly according to claim 5, wherein the extension section comprises a first rectangular pattern and a second rectangular pattern, and the first rectangular pattern and the second rectangular pattern are arranged in sequence by the feed point; and the second rectangular pattern comprises a first edge and a second edge that are opposite to each other, the first edge is aligned with a side of the first rectangular pattern that forms the first slot, and the second edge forms the recessed region with the first rectangular pattern.

7. The antenna assembly according to claim 6, wherein the bending section comprises a third rectangular pattern, the third rectangular pattern comprises a third edge, and the third edge is adjacent and perpendicular to the second edge;

the parasitic branch comprises a fourth rectangular pattern; and each part of the second slot corresponding between the fourth rectangular pattern and the first rectangular pattern and between the second rectangular pattern and the third rectangular pattern has the same width.

8. The antenna assembly according to claim 6, wherein the bending section comprises a fourth edge, and an included angle between the fourth edge and the second edge is an obtuse angle;

the parasitic branch comprises a fourth rectangular pattern; and each part of the second slot corresponding between the fourth rectangular pattern and the first rectangular pattern and between the fourth rectangular pattern and the second rectangular pattern has the same width.

9. The antenna assembly according to claim 5, wherein the first slot comprises a first portion and a second portion, and the first portion corresponds to part of the bending section and coincides with a bending direction of the bending section.

10. The antenna assembly according to claim 5, wherein the parasitic branch has a first arc edge; and the second branch has a second arc edge, and at least part of the second slot is formed between the first arc edge and the second arc edge.

11. The antenna assembly according to claim 1, wherein the layout region has a first surface, a second surface, a first through hole, and a second through hole, the first surface and the second surface deviate from each other, and the first through hole and the second through hole simultaneously communicate with the first surface and the second surface; and the radiation pattern and the parasitic branch are arranged on the first surface, and the feed point and the ground point respectively correspond to the first through hole and the second through hole.

12. The antenna assembly according to claim 11, wherein the antenna assembly further comprises:

a first connection pattern and a second connection pattern simultaneously located on the second surface, wherein the first connection pattern is connected to the radiation pattern through the first through hole, and the second connection pattern is connected to the parasitic branch through the second through hole.

13. The antenna assembly according to claim 12, wherein the second surface comprises a connection surface located at an edge position of the layout region and perpendicular to a thickness direction of the layout region; and the first connection pattern and the second connection pattern simultaneously extend to the connection surface.

14. The antenna assembly according to claim 12, wherein an inner wall of the first through hole comprises a first conical surface expanding towards the first surface;

the parasitic branch has a first arc edge located on the first conical surface and forming part of the second slot with the second branch; and the first arc edge has both a first bending direction and a second bending direction, wherein the first bending direction is along a circumferential direction of the first conical surface, and the second bending direction is curved towards the second surface.

15. The antenna assembly according to claim 1, wherein the length of both the first branch and the second branch is 0.23-0.27λ1, wherein the λ1 is an operating wavelength of the antenna assembly.

16. The antenna assembly according to claim 1, wherein the length of the first branch is negatively related to an operating frequency of the antenna assembly in a high frequency band;

the length of the second branch is negatively related to an operating frequency of the antenna assembly in a low frequency band;

the length of the third branch is negatively related to an operating frequency of the antenna assembly in a low frequency band;

the length of the parasitic branch is negatively related to a bandwidth operating frequency of the antenna assembly in a high frequency band; and the width of the first slot is positively related to an operating frequency of the antenna assembly.

17. A communication terminal, comprising:

a base frame comprising a layout region located at an edge of the base frame;

a radiation pattern arranged in the layout region and comprising a first branch, a second branch, and a third branch opposite to the first branch and the second branch, wherein a feed point is arranged between the first branch and the second branch, and a first slot is formed between the third branch and the first branch and between the third branch and part of the second branch; and a parasitic branch having a ground point, wherein the parasitic branch is arranged in the layout region and forms a second slot with the second branch.

18. The communication terminal according to claim 17, wherein the layout region has a first surface, a second surface, a first through hole, and a second through hole, the first surface and the second surface deviate from each other, and the first through hole and the second through hole simultaneously communicate with the first surface and the second surface;

the radiation pattern and the parasitic branch are arranged on the first surface, and the feed point and the ground point respectively correspond to the first through hole and the second through hole;

and the communication terminal further comprises:

a circuit board arranged on an opposite side of the second surface;

a first connection pattern and a second connection pattern simultaneously located on the second surface, wherein the first connection pattern is connected to the radiation pattern through the first through hole, and the second connection pattern is connected to the parasitic branch through the second through hole; and two elastic connection members mounted on the circuit board, wherein a contact of the two elastic connection members respectively abuts the first connection pattern and the second connection pattern.

19. The communication terminal according to claim 18, wherein the communication terminal further comprises:

a display screen arranged on a side of the circuit board deviating from the base frame and electrically connected to the circuit board; and a housing portion accommodating the display screen, the circuit board, and the base frame and comprising a front surface and a back surface, wherein the second surface faces the back surface.

20. The communication terminal according to claim 17, wherein the layout region comprises a plurality of reserved through holes arranged at intervals along an edge of the layout region, and some of the reserved through holes form the first through hole and the second through hole.

* * * * *